United States Patent [19]

Vetter et al.

[11] 4,156,608

[45] May 29, 1979

[54] COLOR PHOTOGRAPHIC MATERIAL WITH IMPROVED COLOR REPRODUCTION

[75] Inventors: Hans Vetter, Cologne; Walter Puschel; Rigobert Otto, both of Leverkusen, all of Fed. Rep. of Germany

[73] Assignee: AGFA-Gevaert, A.G., Leverkusen, Fed. Rep. of Germany

[21] Appl. No.: 792,526

[22] Filed: May 2, 1977

[30] Foreign Application Priority Data

May 6, 1976 [DE] Fed. Rep. of Germany ....... 2620088

[51] Int. Cl.² .......................... G03C 7/04; G03C 1/76
[52] U.S. Cl. ............................................. 96/9; 96/22; 96/73; 96/74; 96/77; 96/99; 96/100 R
[58] Field of Search ...................... 96/6, 7, 8, 9, 3, 73, 96/99, 77, 74

[56] References Cited

U.S. PATENT DOCUMENTS

| B 351,673 | 1/1975 | Fleckenstein et al. | 96/29 D |
|---|---|---|---|
| 4,028,103 | 6/1977 | Hannie | 96/73 |
| 4,029,503 | 6/1977 | Fujiwhara et al. | 96/9 |
| 4,047,952 | 9/1977 | Pfaff | 96/73 |

FOREIGN PATENT DOCUMENTS 2505248 8/1976 Fed. Rep. of Germany ............. 96/77

OTHER PUBLICATIONS

Research Disclosure No. 15654, pp. 32–39, Apr. 1977.

*Primary Examiner*—J. Travis Brown

[57] ABSTRACT

Suitable masking compounds for masking the undesired color side densities of image dyes produced from color couplers are those of the following formula

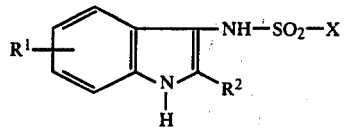

in which
$R^1$ represents hydrogen or one or more substituents such as halogen, alkyl, aryl, a heterocyclic group alkoxy, hydroxyl, amino, acylamino, sulfo, sulfonyl, carboxyl or carbamyl or condensed carbocyclic or heterocyclic ring.

$R^2$ represents alkyl, aryl, a heterocyclic group carboxyl or esters or amide derived from carboxyl X represents a dye group optionally containing a solubilizing group.

On development with black-and-white or color-forming developers the dye group is released imagewise and is removed by aqueous processing baths leaving back a positive color or masking image.

6 Claims, No Drawings

COLOR PHOTOGRAPHIC MATERIAL WITH IMPROVED COLOR REPRODUCTION

This invention relates to a colour photographic material comprising at least one silver halide emulsion layer which material contains non-diffusible coloured compounds from which soluble dyes are liberated during photographic development and are washed out of the material. The material according to the invention is suitable for the production of direct positive coloured images or for the production of colour-masked negative colour images.

It is known that the undesired colour side densities (secondary densities) of image dyes formed during the chromogenic development of colour photographic multilayer materials can be eliminated by masking processes. In the case of colour photographic materials, this result may be achieved by using so-called built-in masks. Masks such as these may be produced, for example during the photographic processing cycle, by using so-called masking couplers which have a colour necessary for masking the undesired colour side densities of the image dyes. Colour couplers suitable for this purpose generally have the same chemical structure as normal colour couplers, except that a substituent containing a chromophoric group, generally an azo dye group, is present at the coupling site for the reaction with the oxidised colour developer. This chromophoric group imparts the colour to the colour coupler and is split off during the reaction with the oxidised colour developer. During color development, the image dye is formed in the exposed and developed areas, whilst the colour of the coloured coupler used remains intact in the unexposed areas. In the most favourable case, the gradation of the undesired secondary density obtained during processing is masked by an equally high, but oppositely directed gradation of the mask dye, resulting in a uniform density in the undesirable spectral region independent of exposure. In cases where an optimally masked colour coupler is used, the secondary colour densities measured behind coloured filters after colour photographic processing are constant and independent of exposure. On account of the azo group, the mask coupler generally has a higher colour density than the undesirable secondary densities of the image dye (azomethine dye) produced during chromogenic development, resulting in overmasking of the undesirable secondary density. In order, therefore, to obtain optimum masking, it is necessary in practice to add to the coloured mask coupler a suitable quantity of a colourless colour coupler which gives the same image dye or an image dye of similar colour. This gives rise to problems of adaptation. A good masking coupler should not only give an image dye of the required colour and other valuable properties, such as fastness to light and stability under extreme storage conditions, but it should itself also have a colour which as far as possible corresponds to the undesirable secondary density of the image dye produced from it. As a result, the range of suitable mask couplers is extremely limited. The situation would be much more favourable if it were possible to use coloured masking compounds which, after chromogenic development, do not themselves contribute to any significant extent to the build-up of the colour image, i.e. for the most part give only colourless development products.

The object of the present invention is to find masking compounds of this type.

It has now been found that direct positive colour images are obtained by developing photosensitive silver halide emulsion layers using negative silver halide emulsions in the presence of non-diffusible derivatives of indole which, in the 3-position of the indole ring system, contain a dye group attached through a sulphonamide group. The development process starts with uniformly coloured layers, from which the dye is liberated, apparently in soluble form, at the exposed areas during development and is washed out of the layer. The direct positive colour images obtained in this way are eminently suitable for masking of colour photographic images.

The present invention provides a colour photographic material comprising at least one photosensitive silver halide emulsion layer, distinguished by the fact that the photosensitive silver halide emulsion layer or a non-photosensitive binder layer adjacent to it contains a non-diffusible coloured compound corresponding to the following formula:

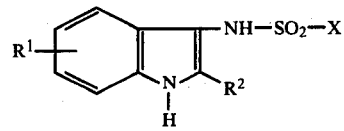

in which
  $R^1$ represents one or more substituents up to four, such as hydrogen, halogen, for example chlorine or bromine, alkyl, in particular lower alkyl with up to 3 carbon atoms, aryl, a heterocyclic group, alkoxy, for example methoxy or ethoxy, hydroxyl, amino, acyl amino, the acyl group being derived from aliphatic or aromatic carboxylic or sulphonic acids, sulpho or sulphamoyl, one or two hydrogen atoms on the nitrogen atom of the sulphamoyl group optionally being substituted by further substituents, for example alkyl radicals, carboxyl or carbamoyl, or the atoms required for completing a fused iso- or heterocyclic ring;
  $R^2$ represents alkyl, aryl, especially phenyl, including substituted phenyl groups, a heterocyclic group, for example furyl or thienyl, including substituted heterocyclic groups, carboxyl or ester groups (for example alkoxy carbonyl) or amide groups (aminocarbonyl) derived therefrom;
  X represents a dye radical or a radical of a dye precursor, preferably containing at least one solubilising group, such as a carboxyl or sulpho group which is attached to the $SO_2$-group either directly or by way of an intermediate member Z; and
  Z represents an intermediate member, such as alkylene with 1 to 6 carbon atoms, arylene or a heterocyclic group, which is attached to X either directly or by way of $-O-$, $-S-$, $-SO_2-$, $-NR-$ (R=hydrogen or alkyl), $-CO-$, $-CONH-$ or $-SO_2NH-$.

The function of the substituents represented by the radicals $R^1$ and, in particular, $R^2$ is primarily to impart the necessary resistance to diffusion to the compounds according to the invention. For this reason, at least one of the substituents $R^1$ and $R^2$ contains a radical rendering the total molecule resistant to diffusion in the binder layers. In the context of the invention, such radicals are radicals of the type which enable the compounds according to the invention to be incorporated in non-diffusible form into the hydrophilic colloids normally used in photographic materials. It is preferred for this purpose to use organic radicals which generally contain straight-chain or branched aliphatic groups and, optionally, also isocyclic or heterocyclic aromatic groups with in general from 8 to 20 carbon atoms. These radicals are attached to the remaining part of the molecule either directly or indirectly, for example through one of the following groups: —NHCO—, —NHSO$_2$—, —NR—, where R represents hydrogen or alkyl, —O—, —S— or —SO$_2$—. In addition, the radical conferring diffusion resistance may also contain water-solubilising groups such as, for example, sulpho groups or carboxyl groups which may also be present in anionic form. Since the diffusion properties depend upon the molecular size of the overall compound used, it is sufficient in certain cases, for example when the total molecule used is large enough, to use even relatively short-chain radicals as the so-called diffusion-resistance conferring radicals.

In principle, suitable dye radicals X are the radicals of dyes of any class, providing they are rendered soluble by the presence of solubilising groups to such an extent that they can be washed out of the layer. Dye radicals which are particularly suitable for the material according to the invention are derived, for example, from azo dyes, anthraquinone dyes, phthalocyanine dyes, indigo dyes or triphenyl methane dyes, azomethine dyes, indoaniline dyes, indophenol dyes or metal complex dyes. In the context of the invention, the radicals of dye precursors are the radicals of compounds which are converted into dyes during photographic processing by standard or additional processing steps, either by oxidation or by the uncovering of an auxochromic group in a chromophoric system, for example by hydrolysis. Dye precursors in this sense may be leuco dyes or even dyes which are converted into other dyes during processing. The change in colour must of course, not be limited to the dye precursor moiety after splitting off from the masking compound but must take place as well with the non-split masking compound itself.

Unless a distinction between dye radicals and the radicals of dye precursors is of the utmost importance, the radicals of dye precursors are also intended to be covered in the following by the generic expression "dye radicals". Azo dyes are particularly preferred by virtue of their fastness to light and by virtue of their ready preparative availability.

The following are examples of non-diffusible coloured compounds according to the invention:

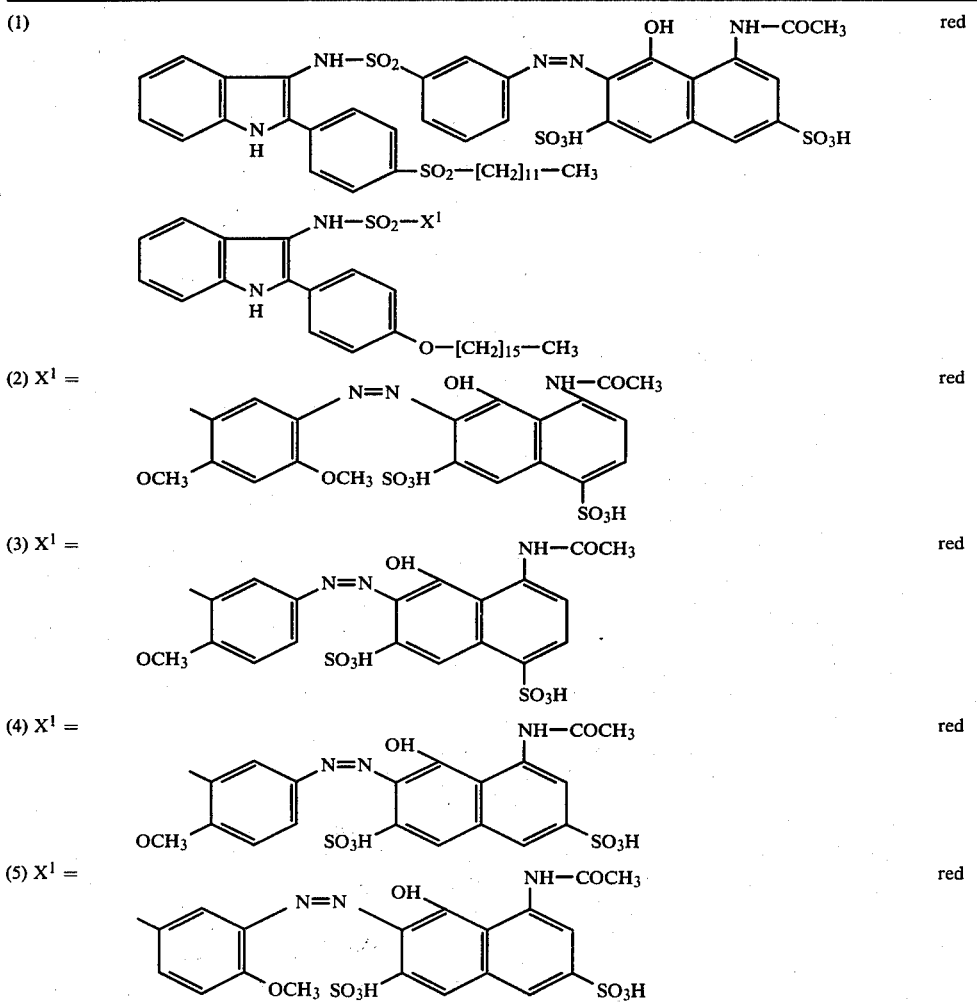

| | | |
|---|---|---|
| (6) X¹ = | [structure: 3-methyl-4-methoxyphenyl–N=N–(1-hydroxy-8-acetamido-naphthalene-5-sulfonic acid)] | red |
| (7) X¹ = | [structure: 2-methoxy-5-methylphenyl–N=N–(1-hydroxy-8-acetamido-3-sulfo-naphthalene-5-sulfonic acid)] | red |
| (8) X¹ = | [structure: 2,4-dimethoxy-5-methylphenyl–N=N–(1-hydroxy-8-acetamido-naphthalene-5-sulfonic acid)] | red |
| (9) X¹ = | –[CH₂]₄–O–[2-methylphenyl]–N=N–(1-hydroxy-8-acetamido-3-sulfo-naphthalene-5-sulfonic acid) | red |
| (10) X¹ = | –[CH₂]₄–O–[2-methylphenyl]–N=N–(1-hydroxy-8-acetamido-3-sulfo-naphthalene-6-sulfonic acid) | red |
| (11) X¹ = | [2-methoxy-5-methylphenyl]–N=N–(1-hydroxy-8-acetamido-3-sulfo-naphthalene-6-sulfonic acid) | red |
| (12) X¹ = | [4-methylphenyl]–N=N–(1-hydroxy-8-acetamido-naphthalene-5-sulfonic acid) | red |
| (13) X₁ = | [2-chloro-5-methylphenyl]–N=N–(1-hydroxy-8-acetamido-3-sulfo-naphthalene-5-sulfonic acid) | red |
| (14) X₁ = | –(CH₂)₄–O–[4-methylphenyl]–N=N–(1-hydroxy-8-acetamido-3-sulfo-naphthalene-5-sulfonic acid) | red |
| (15) X₁ = | [4-chloro-3-methylphenyl]–N=N–(1-hydroxy-8-acetamido-3-sulfo-naphthalene-5-sulfonic acid) | red |

-continued
(16) $X_1 =$ 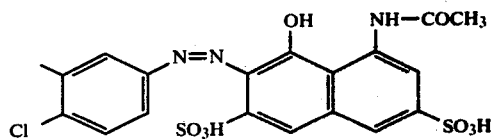 red
(17) $X_1 =$ 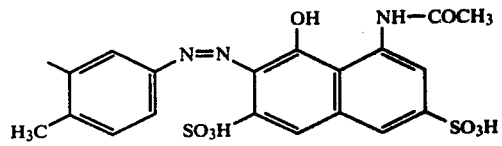 red
(18) $X_1 =$ 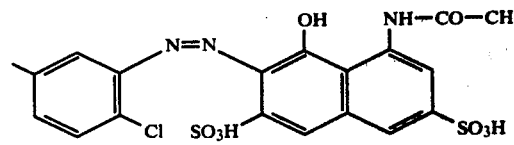 red
(19) $X_1 =$ 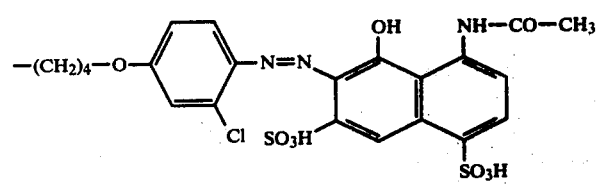 red
(20) $X^1 =$ 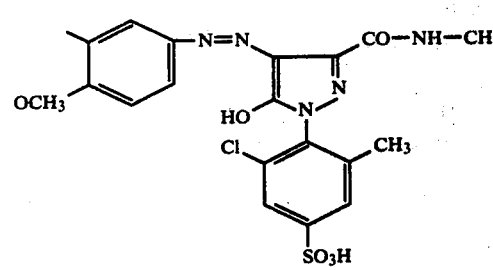 yellow
(21) $X^1 =$ 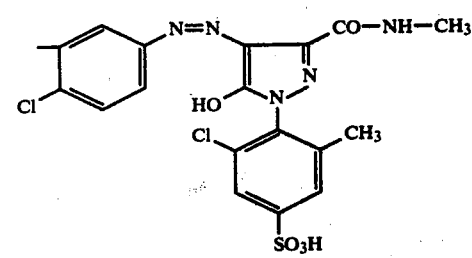 yellow
(22) $X^1 =$ 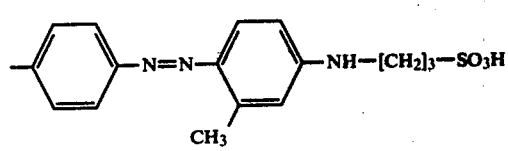 yellow
(23) $X^1 =$ 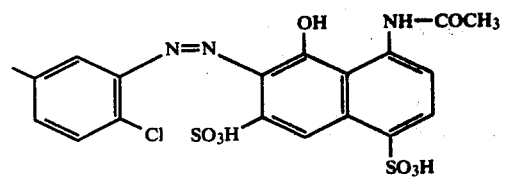 red
(24) 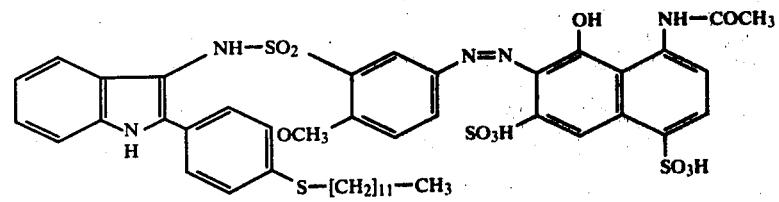 red

(25) 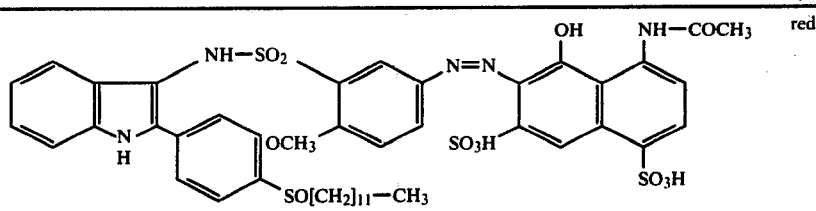 red

(26) 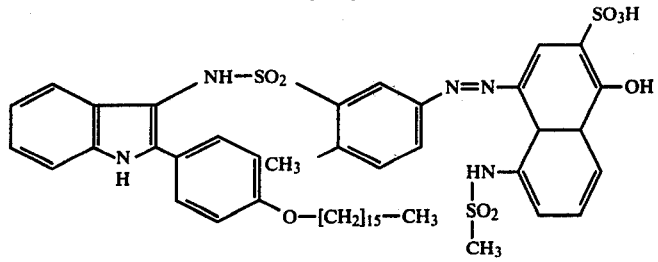

(27) 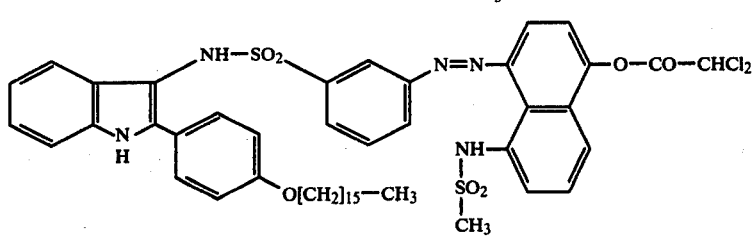

(28) 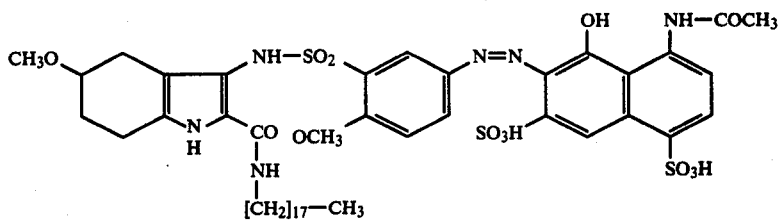

Where $R^1$ or $R^2$ are difunctional radicals, for example $R^{1\prime}$ or $R^{2\prime}$, they may join two indole rings to one another, for example as follows:

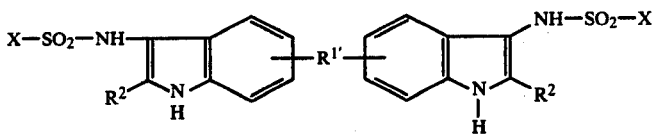

or

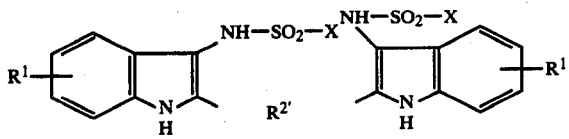

The coloured compounds according to the invention may essentially be produced by one of the following three methods:
A. Diazotizing aminobenzene sulphonamido indoles and coupling onto suitable coupling components by the methods normally used in azo chemistry. The aminobenzene sulphonamido indoles used as starting compounds may be obtained by reacting 3-amino indoles with nitrobenzene sulphonic acid halides, followed by (for example catalytic) reduction of the nitro group.
B. Reacting dye sulpho halides with 3-amino indoles.
C. Condensing dye sulphinic acids with 3-imino indolenines.

The production of some of the compounds used according to the invention is described in detail in the following.

Production of compound 1

25.9 g of compound (I):

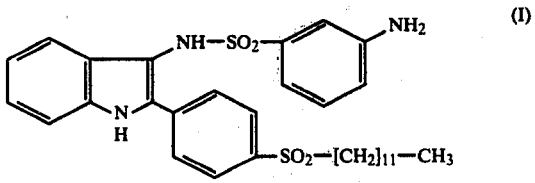

are dissolved in 250 ml of acetone and diazotized at 0° C. with 10 ml of 30% sodium nitrite solution following the addition of 12 ml of concentrated hydrochloric acid.

On completion of the addition, the solution is stirred for 1 hour and any undissolved constituents are filtered off under suction. The diazo solution is slowly added to a neutral solution of 23.5 g of the sodium salt of 1-acetamino-8-hydroxy naphthalene-3,6-disulphonic acid in 100 ml of water, to which 15 g of sodium hydrogen carbonate have been added, followed by stirring for 3 hours at 0° C. The product precipitated is filtered off under suction, washed with water and dried. The dry residue is stirred into 200 ml of acetone, filtered under suction and washed with 50 ml of acetone. The dye is then stirred for 2 hours into 200 ml of water containing 30 ml of 20% sodium carbonate solution, followed by filtration under suction. The residue is then stirred into 100 ml of acetone, 130 ml of ethyl acetate are added and the mixture is stirred for another 30 minutes, followed by filtration under suction, washing with ethyl acetate and drying. Yield 8.5 g.

Production of compound 2

13.5 g of 2-(4-hexadecyloxyphenyl)-3-amino indole are dissolved in 150 ml of pyridine and 23.4 g of the dye sulphobromide corresponding to formula (II):

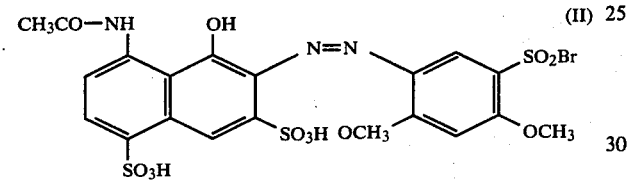

are added and the mixture stirred for 1 hour. After standing overnight, 250 ml of 5N hydrochloric acid are added dropwise. The dye precipitated is filtered off under suction and squeezed out on clay. The still moist residue is stirred into acetone, filtered under suction, washed with acetone and dried. 23.7 g of the crude product thus obtained are stirred for 1 hour into 225 ml of dimethyl formamide, heated to 90° C., cooled and the insoluble residue is filtered off under suction. The dye contained in the mother liquor is precipitated with 500 ml of acetone, filtered under suction and washed with 200 ml of acetone. The residue is boiled up in 100 ml of methanol, cooled, filtered off under suction, washed with 50 ml of methanol and dried. Yield: 9.1 g.

The dye sulphobromide of formula (II) is obtained as follows: 32.8 g of the sulphinic acid dye corresponding to formula (III):

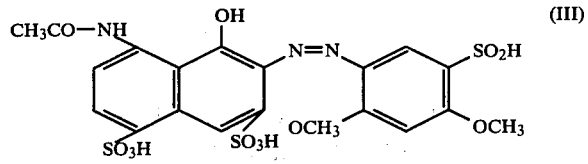

are dissolved under gentle heat in 3 to 8 ml of water, cooled and 2.7 ml of bromine are added dropwise over a period of 5 minutes at 20° C. The dye sulphobromide precipitates and, after stirring for 10 minutes, is filtered off under suction and washed with 5% sodium chloride solution. After suspension in acetone, the product is filtered off under suction, washed with acetone and dried. Yield: 25.5 g.

By far the best method for producing the compounds used according to the invention is based on the addition of dye sulphinic acids to 3-imino indolenines.

Production of compound 3

4.5 g of 2-(4-hexadecyloxyphenyl)-3-imino indolenine are stirred into 50 ml of ethylene glycol monomethyl ether with 7.2 g of the dye sulphinic acid corresponding to formula (IV) (in the form of its trisodium salt):

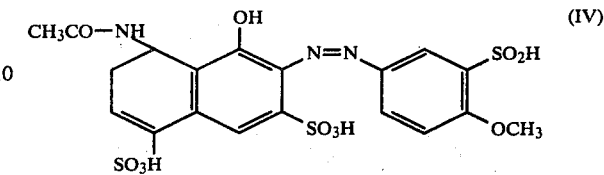

5 ml of glacial acetic acid are added and the mixture is stirred for 30 minutes at room temperature, heated for 10 minutes to 95° C., 55 ml of water are added, the temperature is kept at 95° C. for another 10 minutes, after which the mixture is cooled and the masking compound precipitated is filtered off under suction and washed with water until the water running off is clear. The residue is suspended in 100 ml of acetone, filtered under suction, washed with 50 ml of acetone, 50 ml of ethyl acetate, 50 ml of chloroform and 50 ml of acetone and dried. Yield: 8.7 g.

The 2-(4-hexadecyloxyphenyl)-3-imino indolenine is obtained as follows:

3.8 g of finely powdered potassium permanganate are stirred into 100 ml of acetone, followed by the introduction in portions over a period of 30 minutes of 9 g of 2-(4-hexadecyloxyphenyl)-3-amino indole. After stirring for 30 minutes at room temperature, 50 ml of acetone are added, the mixture is heated to boiling point and the hot solution is filtered off under suction from the manganese dioxide which is washed twice with 50 ml of hot acetone. 50 ml of water are then added to the mother liquor combined with the washing solutions, after which the mixture is heated to boiling point and cooled. The product precipitated is filtered off under suction and then washed with water. The residue is stirred into methanol, filtered off under suction, washed with methanol and dried. Yield: 7.4 g, m.p.: 82°–84° C.

Since the compounds used according to the invention, when processed by the Flexicolor process, for example described in The British Journal of Photography, July 1974, page 597, show very little, if any, coupling colour, it is possible to use both yellow and also red masks without affecting the particular colour layer. A pale grey coupling colour occurs during development at 20° C. with N,N-diethyl-p-phenylene diamine.

The masking compounds may readily be obtained in high yields and purity by method C. Since aminobenzene sulphinic acids are available in large numbers and may readily be produced, they can be coupled after diazotization with a variety of different coupling components (containing solubilising groups) by the methods normally used in azo chemistry, so that a large number of masking compounds differing in colour nuance and solubility may be obtained.

According to the invention, compounds containing an azo dye radical or a radical or another class of dyes of any colour may be produced by any of the three methods A, B and C.

As already mentioned, it is possible to obtain direct positive coloured images by means of the non-diffusible coloured compounds used according to the invention. Photosensitive materials containing at least one photosensitive silver halide emulsion layer with which one of the coloured compounds according to the invention is associated are used for this purpose. After image-wise exposure, the material is developed with a standard black-and-white developer, for example with phenidone, an image-wise distribution of soluble dye being formed over the exposed areas. This soluble dye is washed out of the layer. Accordingly, the dye is removed from the layer in the exposed areas, whilst the coloured compound remains behind in the layer in the unexposed areas.

However, the coloured compounds according to the invention are preferably used in colour photographic multilayer materials for masking the undesirable secondary colour densities of the image dyes formed from the color couplers present in materials of this type. Materials of this kind normally contain at least one red-sensitive silver halide emulsion layer with which a non-diffusible colour coupler is associated for producing the cyan component colour image, a green-sensitive silver halide emulsion layer, with which a non-diffusible colour coupler is associated for producing the magenta component colour image, and a blue-sensitive silver halide emulsion layer with which a non-diffusible colour coupler is associated for producing a yellow component colour image. According to the invention, a non-diffusible compound corresponding to the general formula is associated with at least one of the above-mentioned silver halide emulsion layers, more especially with the silver halide emulsion layers whose associated colour couplers give rise to the formation of image dyes with undesirable secondary colour densities. Since in particular the magenta and cyan dyes produced from colour couplers show secondary colour densities such as these, the compounds according to the invention are preferably associated with the green-sensitive and/or with the red-sensitive silver halide emulsion layer. For example, the image dye formed in the green-sensitive silver halide emulsion layer may show a yellow secondary colour density. In this case, a yellow compound according to the invention may be associated with the green-sensitive silver halide emulsion layer in accordance with the invention for masking purposes. Similarly, a red compound may be used for masking the red secondary colour density of the cyan dye formed in the red-sensitive silver halide emulsion layer. If the cyan dye formed in the red-sensitive silver halide emulsion layer shows a troublesome yellow secondary colour density, a yellow compound may accordingly be used for masking it. In the context of the invention, the expressions "association" and "associated" mean that the mutual arrangement of silver halide emulsion and non-diffusible coloured compound is such as to permit an interaction between them which allows an image-wise consistency between the silver image formed and the image-wise reaction of developer oxidation products with the compounds according to the invention. The associated coloured compound is incorporated in the silver halide emulsion layer itself or in a layer adjacent the silver halide emulsion layer, the adjacent layer preferably being situated behind the silver halide emulsion layer (looking in the direction of the incident light during exposure).

The non-diffusible coloured compounds used according to the invention are added to the photosensitive silver halide emulsions or other casting solutions by conventional methods. Since, in the present case, the compounds in question are generally water-soluble compounds, they may be added to the emulsions in the form of aqueous solutions, optionally containing additions of water-miscible organic solvents, such as ethanol, acetone or dimethyl formamide. The quantity in which the coloured compounds used according to the invention is added may amount, for example, to between 0.005 to 0.2 mole per mole of silver halide, although the actual quantity added is governed by the requirements of the particular individual case. In the production of direct positive coloured images, the quantity added will, of course, be somewhat larger than in cases where the compound is used as a masking compound.

The compounds used according to the invention are presumably oxidised by the developer oxidation products formed during development of the silver halide and subsequently undergo hydrolytic splitting under the alkaline development conditions. The dye radical is split off in diffusible and soluble form and may be washed out from the layer. Accordingly, the processing of the materials according to the invention is not limited to development with colour developer compounds, but instead may also be carried out with conventional black-and-white developers, such as hydroquinone or phenidone. It is not entirely clear whether this discussed mechanism also applies to processing with colour developers because in this case a pale grey coupling colour can occasionally occur, especially during development with diethyl-p-phenylene diamine at room temperature. Where processing is carried out with colour developers at elevated temperature, for example with 2-amino-5-(N-ethyl-N-betahydroxyethylamino)-toluene, very little, if any, coupling colour is obtained so that the coloured compounds used according to the invention are eminently suitable for use as mask compounds for colour photographic negative materials.

The usual silver halide emulsions are suitable for the purposes of the invention. These emulsions may contain, as the silver halide, silver chloride, silver bromide or mixtures thereof, optionally with a small amount of silver iodide of up to 20 mole %. The emulsions are preferably standard negative emulsions, although it is also possible to use direct positive emulsions, for example of the type which show high sensitivity within the silver halide grains, for example emulsions of the kind described in U.S. Pat. No. 2,592,250.

Gelatin is preferably used as binder for the photographic layers. However, the gelatin may be completely or partly replaced by other natural or synthetic binders. Examples of natural binders are alginic acid and its derivatives, such as salts, esters or amides, cellulose derivatives, such as carboxy methyl cellulose, alkyl cellulose, such as hydroxyethyl cellulose, starch or its derivatives, such as ethers or esters, or carragenates. Examples of synthetic binders are polyvinyl alcohol, partially hydrolysed polyvinyl acetate and polyvinyl pyrrolidone.

The emulsions may also be chemically sensitised, for example by the addition during chemical ripening of sulphur-containing compounds, for example allyl isothiocyanate, allyl thiourea or sodium thiosulphate. In addition, reducing agents, for example the tin compounds described in Belgian Pat. Nos. 493,464 or 568,687, polyamines such as diethylene triamine, or aminomethane sulphinic acid derivatives, for example according to Belgian Pat. No. 547,323, may also be used as chemical sensitisers.

Other suitable chemical sensitisers are noble metals such as gold, platinum, palladium, iridium, ruthenium or rhodium and also compounds of these metals. This method of chemical sensitisation is described in the Article by. R. Koslowsky in Z. Wiss. Phot. 46. 65–72 (1951).

It is also possible to sensitise the emulsions with polyalkylene oxide derivatives, for example with polyethylene oxide having a molecular weight of from 1000 to 20,000 and also with condensation products of alkylene oxides and aliphatic alcohols, glycols, cyclic dehydration products of dexitols, with alkyl-substituted phenols, aliphatic carboxylic acids, aliphatic amines, aliphatic diamines and amides. The condensation products have a molecular weight of at least 700, preferably more than 1000. In order to obtain special effects, it is of course also possible to use these sensitisers in combination, as described in Belgian Pat. No. 537,278 and in British Pat. No. 727,982.

The emulsions may also be spectrally sensitised for example with the usual mono- or poly-methine dyes, such as acid or basic cyanines, hemicyanines, streptocyanines, merocyanines, oxonols, hemioxonols, styryl dyes or other, even trinuclear or polynuclear methine dyes, for example rhodacyanines or neocyanines. Sensitisers of this type are described, for example, in F. M. Hamer's book entitled "The Cyanine Dyes and Related Compounds" (1964), Interscience Publishers, John Wiley and Sons.

The emulsions may contain conventional stabilisers such as, for example, homeopolar or salt-like compounds of mercury with aromatic or heterocyclic rings, such as mercapto triazoles, simple mercury salts, sulphonium-mercury double salts and other mercury compounds. Other suitable stabilisers are azaindenes, preferably tetra- or penta-azaindenes, especially those substituted by hydroxyl or amino groups. Compounds such as these are described in the Article by Birr in Z. Wiss. Phot. 47. 2–27 (1952). Other suitable stabilisers are inter alia heterocyclic mercapto compounds, for example phenyl mercaptotetrazole, quaternary benzthiazole derivatives, benzthiazole derivatives and benztriazole.

The emulsion may be hardened in the usual way, for example with formaldehyde or halogen-substituted aldehyde which contain a carboxyl group, such as mucobromic acid, diketones, methane sulphonic acid esters and dialdehydes.

The photographic layers may also be hardened with hardeners of the epoxy type, the heterocyclic ethylenimine type or the acryloyl type. Examples of hardeners such as these are described, for example in German Offenlegungsschrift No. 2,263,602 or in British Pat. Specification No. 1,266,655. In addition, it is also possible to harden the layers by the process described in German Offenlegungsschrift No. 2,218,009 in order to obtain colour photographic materials which are suitable for high temperature processing.

The photographic layers or the colour photographic multilayer materials may also be hardened with hardeners of the diazine, triazine or 1,2-dihydroquinoline series, as described in British Pat. Specifications Nos. 1,193,290; 1,251,091; 1,306,544 and 1,266,655, French Pat. No. 7,102,716 or DT-OS No. 2,332,317. Examples of hardeners such as these are diazine derivatives containing alkyl or aryl sulphonyl groups, derivatives of hydrogenated diazines or triazines such as, for example, 1,3,5-hexahydrotriazine, fluorine-substituted diazine derivatives such as, for example, fluoropyrimidines esters of 2-substituted 1,2-dihydroquinoline or 1,2-dihydroisoquinoline-N-carboxylic acids. Other suitable hardeners are vinyl sulphonic acid hardeners, carbodiimide or carbamoyl hardeners of the type described, for example in German Offenlegungsschrifts Nos. 2,263,602; 2,225,230 and 1,808,685, French Pat. No. 1,491,807, German Patent Specification No. 872153 and East German Pat. No. 7218. Other suitable hardeners are described for example, in British Pat. Specification No. 1,268,550.

The usual layer supports may be used for the materials according to the invention. Suitable layer supports are, for example, films of cellulose nitrate, cellulose acetate, such as cellulose triacetate, polystyrene, polyesters, such as polyethylene terephthalate, polyolefins, such as polyethylene or polypropylene, and even baryta paper supports or polyolefin-lined, for example polyethylene-lined, paper supports and glass.

In cases where the coloured compounds of the material according to the invention are used for masking purposes in colour photographic materials, these materials generally contain non-diffusible compounds, for example colour couplers for producing the various component colour images of which the colour is normally complementary to the spectral sensitivity of the associated silver halide emulsion layers, for example, a non-diffusible cyan-forming colour coupler, generally a coupler of the phenol or naphtol type, is associated with the red-sensitive layer for producing the cyan component colour image. A non-diffusible magenta-forming colour coupler, normally a colour coupler of the 5-pyrazolone or indazolone type is associated with the green-sensitive layer for producing the magenta component colour image. Finally, a non-diffusible yellow-forming colour coupler, generally a colour coupler with an open-chain ketomethylene group, is associated with the blue-sensitive silver halide emulsion layer for producing the yellow component colour image. Colour couplers of this type are known in large numbers and are described in a number of Patent Specifications. For example, reference is made here to the publication entitled "Farbkuppler" (Colour Couplers) by W. Pelz in "Mitteilungen aus den Forschungslaboratorien der Agfa, Leverkusen/Munchen", Vol. III (1961) and K. Venkataraman in "The Chemistry of Synthetic Dyes", Volume 4, 341–387, Academic Press, (1971). The non-diffusible colour couplers may contain a releasable substituent at the coupling site so that, for colour formation, they only require two equivalents of silver halide in contrast to the usual four-equivalent couplers. In general the colour couplers used are themselves colourless. However, in cases where the releasable substituent contains a chromophoric group, as in known masking couplers, the colour couplers generally have a colour which is suitable for masking undesirable secondary densities of the image dye by conventional masking techniques. According to the invention, however, there is no need to use coloured mask couplers of the usual type. The image dyes produced from colour couplers are generally resistant to diffusion.

The 2-equivalent couplers also include the so-called DIR-couplers which are colour couplers containing in the coupling site a releasable substituent which is liberated as a diffusible development inhibitor during reaction with oxidised colour developer. DIR-couplers such as these are described, for example, in U.S. Pat. No. 3,227,554. Reference is also made at this juncture to other compounds which release a development inhibitor on reaction with colour developer oxidation products without at the same time forming a dye. Compounds such as these, which may be referred to as DIR-compounds to distinguish them from the DIR-couplers are described for example in U.S. Pat. No. 3,632,345, in German Offenlegungsschriften Nos. 2,359,295, 2,405,442, 2,448,063, 2,529,350, 2,502,892 and 2,540,959. DIR-Couplers and DIR-Compounds may be used in the colour photographic materials according to the invention in order to influence graininess sharpness and, by way of the interimage effects, colour reproduction in known manner. In this connection, reference is made to the Article entitled "Development-Inhibitor-Releasing (DIR)Couplers in Colour Photography" in Photographic Science and Engineering, Vol. 13, page 74.

To produce the individual component colour images the colour photographic material according to the invention may also contain, instead of uniform silver halide emulsion layers, two or more component layers which, although spectrally sensitised in the same way, may have different sensitivities. In general, the component layer with greater sensitivity is arranged over the component layer with the lower sensitivity sensitised to light of the same spectral region. For producing the same component colour image the various layers do not necessarily have to be adjacent to one another, but instead may even be separated from one another by non-photosensitive binder layers or by photosensitive silver halide emulsion layers of different spectral sensitivity.

The invention is illustrated by the following Examples.

EXAMPLE 1

The following components were added while stirring to a red-sensitised highly sensitive silver bromide iodide emulsion containing per kg 95.2 g of gelatin and 0.45 mole of silver halide (of which about 5 mole % is AgI):
42 g of the cyan-forming coupler

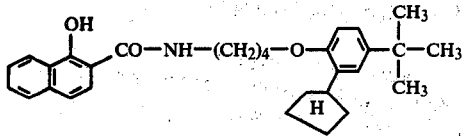

(emulsified in gelatin with tricresyl phosphate as oil former);
2 g of the DIR-coupler

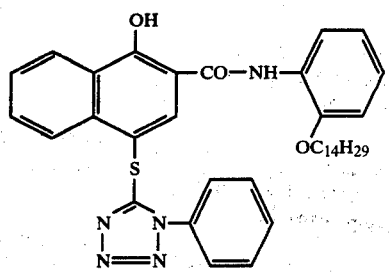

(also in emulsion) and
7 g of compound 3 in the form of a 2% aqueous solution.

Following the addition of stabiliser, wetting agent and hardener, a 5μ thick layer is applied in the usual way to a cellulose triacetate layer support and is coated with a 2μ thick layer of gelatin.

After drying, the material is exposed behind a continuous grey wedge and processed by the method described in British Journal of Photography, July 1974, page 597. Sensitometric evaluation shows that the material is masked in the blue and green spectral regions.

EXAMPLE 2

Following the procedure of Example 1, effective masking is obtained with the following combinations:
  (a) 42 g of the cyan-forming coupler of Example 1
  2 g of the DIR-coupler of Example 1
  8.2 g of compound 11
  (b) 40 g of the cyan-forming coupler

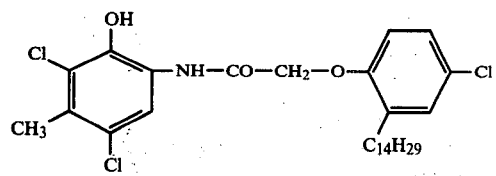

(in emulsion)
  2 g of the DIR-coupler of Example 1
  8 g of compound 7
  (c) 29 g of the cyan-forming coupler of Example 1
  12 g of the cyan-forming coupler of Example 2b
  1 g of the DIR compound

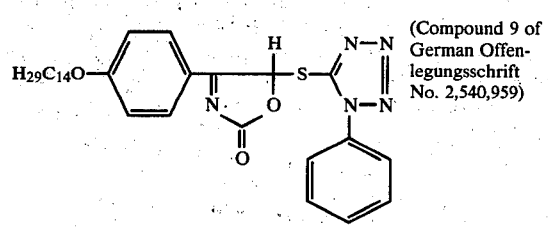

(Compound 9 of German Offenlegungsschrift No. 2,540,959)

(in emulsion)
  6 g of compound 4
  (d) 29 g of the cyan-forming coupler of Example 1
  12 g of the cyan-forming coupler of Example 2b
  2 g of the DIR-coupler of Example 1
  6.4 g of compound 9

EXAMPLE 3

The following components were added while stirring to a green-sensitised silver bromide emulsion containing per kg 95.2 g of gelatin and 0.4 mole of AgBr:
32 g of the magenta-forming coupler

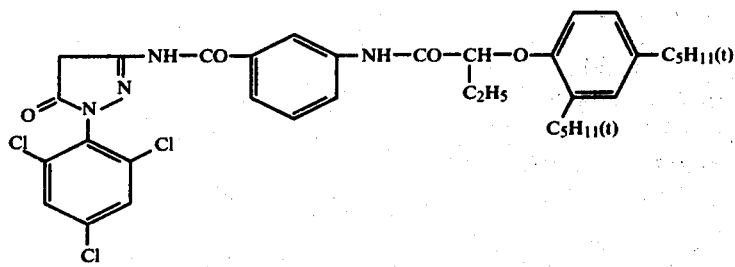

(in emulsion in gelatin with dibutyl phthalate as oil former)

3.5 g of the DIR-coupler

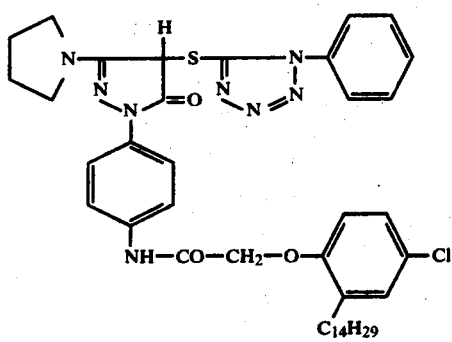

(also in emulsion) and 8 g of compound 13 in the form of a 2% aqueous solution.

A magenta image with effectively masked yellow secondary densities was obtained.

We claim:

1. A colour photographic multilayer material with at least one red-sensitive silver halide emulsion layer, with which non-diffusible colour coupler is associated for producing the blue-green component colour image, a green-sensitive silver halide emulsion layer, with which a non-diffusible colour coupler is associated for producing the purple component colour image, and a blue-sensitive silver halide emulsion layer with which a non-diffusible colour coupler is associated for producing the yellow colour component image, wherein a non-diffusible coloured compound of the following formula is associated with at least one of the above-mentioned red-sensitive and green-sensitive silver halide emulsion layers:

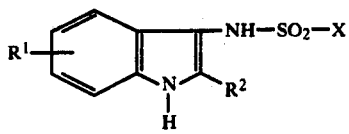

in which
- $R^1$ represents one or more substituents selected from hydrogen halogen, alkyl, aryl, alkoxy, hydroxyl, amino, acylamino, sulpho, sulfamoyl carboxyl or carbamoyl;
- $R^2$ represents alkyl, aryl groups, or a non-coupling alkoxy carbonyl group or a non-coupling carbamoyl group; and
- X represents a dye radical or a radical of a dye precursor carrying a solubilizing group 2. A colour photographic multilayer material as claimed in claim 1, wherein the dye radical represented by X is attached to the $SO_2$-group either directly or through an intermediate member Z, Z representing alkylene with 1 to 6 carbon atoms, arylene or a heterocyclic group which are attached to X either directly or by way of —O—, —S—, —$SO_2$—, —NR— (R=hydrogen or alkyl), —CO—, —CONH— or —$SO_2$NH—.

3. A colour photographic multilayer material as claimed in claim 2, wherein X represents a radical of the following formula:

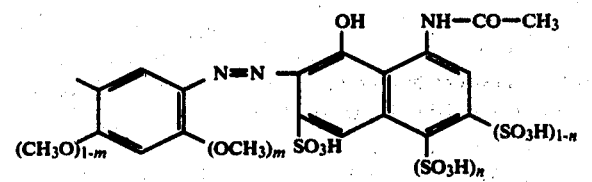

in which m and n independently of one another represents 0 or 1.

4. A colour photographic multilayer material as claimed in claim 3, wherein it contains a coloured compound corresponding to the following formula:

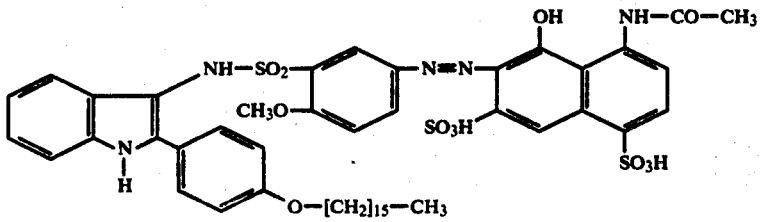

5. A colour photographic multilayer material as claimed in claim 2, wherein X represents a radical of the following formula:

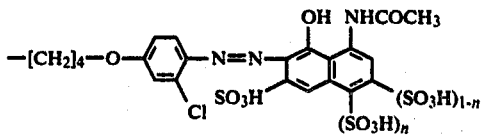

in which n=0 or 1.

6. A process for the production of colour-corrected colour photographic images, in which a colour photographic multilayer material with at least one red-sensitive silver halide emulsion layer, with which a non-diffusible colour coupler is associated for producing the cyan component colour image, a green-sensitive silver halide emulsion layer, which a non-diffusible colour coupler is associated for producing the magenta component colour image, and a blue-sensitive silver halide emulsion layer which a non-diffusible colour coupler is associated for producing the yellow component colour image, is exposed image-wise and developed with a colour developer compound containing a primary aromatic amino group, wherein a non-diffusible coloured compound corresponding to the following general formula is associated with at least one of the above-mentioned red-sensitive and green-sensitive silver halide emulsion layers:

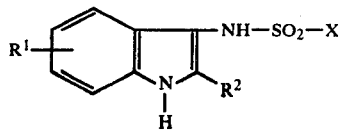

in which:
R¹ represents one or more substituents selected from hydrogen, halogen, alkyl, aryl, alkoxy, hydroxyl, amino, acylamino, sulpho, sulfamoyl, carboxyl or carbamoly;
R² represnts alkyl, aryl groups, or a non-coupling alkoxy carbonyl group or a non-coupling carbamoyl group; and
X represents a dye radical or a radical of a dye precursor carrying a solubilizing group.

* * * * *